United States Patent [19]

Napier

[11] 4,387,023
[45] Jun. 7, 1983

[54] TRANSMISSION FILTER ADAPTER

[76] Inventor: Dwight Napier, Diamond Springs, Calif. 95619

[21] Appl. No.: 90,602

[22] Filed: Nov. 5, 1979

[51] Int. Cl.³ .............................................. F01M 11/03
[52] U.S. Cl. .................................... 210/168; 210/232; 210/239; 210/445; 210/450
[58] Field of Search ............... 210/232, 168, 223, 239, 210/445, 450, 451, 452

[56] References Cited

U.S. PATENT DOCUMENTS

| | | | |
|---|---|---|---|
| 3,014,592 | 12/1961 | Stephen | 210/168 |
| 3,168,468 | 2/1965 | Jagdmann | 210/168 |
| 3,371,793 | 3/1968 | Farler | 210/168 |
| 3,784,011 | 1/1974 | Ward | 210/223 |
| 4,136,011 | 1/1979 | Joseph | 210/168 |
| 4,165,082 | 8/1979 | Foucia et al. | |

Primary Examiner—Peter A. Hruskoci
Attorney, Agent, or Firm—Gordon L. Peterson

[57] ABSTRACT

An adapter for attaching a filter to a fluid transmission comprising an adapter plate having a series of attaching holes adjacent its periphery for attaching the adapter plate to a housing section of the fluid transmission. The adapter plate has first and second opposite faces and a suction opening. A resilient grommet is carried by the adapter plate at the suction opening with the grommet projecting from the first face of the adapter plate. The grommet has a passage extending through it to provide communication between the opposite faces of the adapter plate. A fluid filter can be attached to the adapter plate with the grommet spacing the filter from the adapter plate and providing communication between the suction opening and the filter.

7 Claims, 5 Drawing Figures

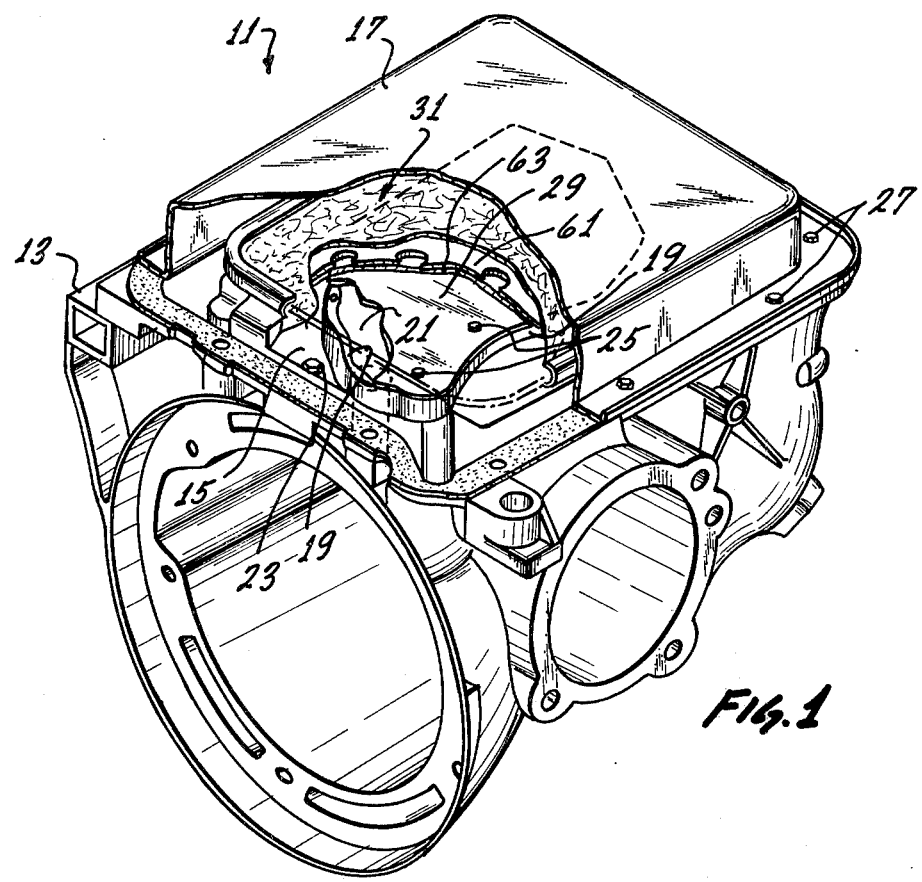
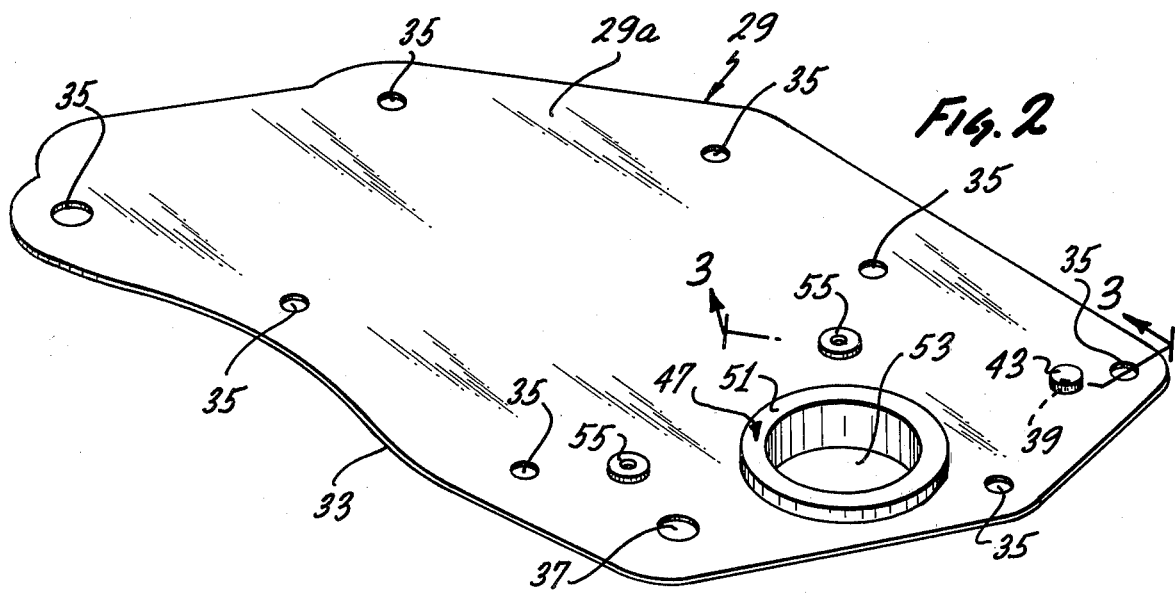

TRANSMISSION FILTER ADAPTER

BACKGROUND OF THE INVENTION

Fluid transmissions utilize a fluid or oil which should be filtered during use of the transmission. Unfortunately, the filtering of the transmission fluid for many transmissions is very inadequate.

For example, fluid transmissions typically include upper and lower housing sections held together by threaded fasteners, with the lower housing section confronting the pan. The lower housing section has a wall which defines an open-ended cavity which opens into the pan. In at least one prior art construction, a screen extends across the open-ended cavity to provide some mechanical filtering of the trasmission fluid as it passes through the screen. This screen is incapable of filtering the fluid to the extent required for maximum life of the fluid and the transmission.

In an attempt to provide improved filtering for transmission fluid, a filter has been provided which has a much greater filtering area than the screen and an ability to filter out much smaller particles. This filter includes two layers of porous material separated by an apertured interior support to provide a two-sided hollow filter. This filter does a much better job of filtering transmission fluid, but unfortunately due to its construction, it cannot be used with many automotive and truck fluid transmissions.

SUMMARY OF THE INVENTION

This invention enables utilization of the improved filter with many of the automotive and truck fluid transmissions with which it was not heretofore usable. Accordingly, with this invention, a greater number of fluid transmissions can receive the benefits of improved filtering of the transmission fluid. To obtain these advantages, this invention provides an adapter plate for attaching the improved fluid filter to the transmission.

The fluid transmission with which the present invention is used typically includes first and second housing sections. The first housing section includes wall means defining an open-ended cavity for fluid, bolt holes arranged in a predetermined pattern in the wall means, and fasteners in the bolt holes for attaching the first and second housing sections together.

No additional fasteners are required to attach the adapter plate to the transmission because the adapter plate has a series of attaching holes arranged so that at least some of the attaching holes can be in registry with at least some of the bolt holes in the wall means. This enables the same fasteners which are used to attach the housing sections together to be used to mount the adapter plate on the transmission.

The adapter plate is mounted on the transmission so that it covers the open end of the cavity. The interface between the wall means and the adapter plate is sealed as by a separate gasket or by a gasket which is permanently affixed to the adapter plate. To assure adequate sealing area, the periphery of the adapter plate may lie just outside the periphery of the wall means.

To permit oil to flow through the adapter plate, the adapter plate has a suction opening leading into the cavity. The suction opening lies within the region which is circumscribed by the attaching holes.

The fluid filter with which the adapter plate is adapted to be used has outer and inner filter surfaces and a suction opening in the inner filter surface. Means is provided for attaching the filter to the adapter plate with the suction openings being in communication. Spacer means is provided for spacing the inner filter surface from the adapter plate so that the area of the inner filter surface can also be utilized for fluid filtering purposes. The spacer means can also advantageously provide communication between the suction openings.

In a preferred construction, the spacer means includes a resilient grommet carried by the adapter plate at the suction opening of the adapter plate. The grommet has a passage extending through it which provides communication between the suction openings. The grommet serves as a seal to seal the filter to the adapter plate.

To enable the same adapter plate to be utilized with fluid transmissions of different constructions, one or moreof the attaching holes is of larger area than another of the attaching holes. The large attaching hole can be used to provide considerable latitude in location of the associated bolt hole in the wall means. Because this attaching hole is oversized, a seal is provided to prevent leakage through it.

To further adapt the adapter plate for use with transmissions of different constructions, a sufficient number of appropriately located attaching holes must be provided. This means that, when the adapter plate is used on a transmission of a first construction, one or more of the attaching holes may not be utilized. If the non-used attaching hole is inside of the adapter seal, it is necessary to plug this hole in order to avoid leakage of transmission fluid through it. Accordingly, a suitable plug is provided for plugging any unused adapter hole.

The filter can be attached to the adapter plate by one or more fasteners which extend through the filter and into apertures in the adapter plate. To reduce the likelihood of stripping the threads in the adapter plate, self-clinching fasteners having one portion thereof carried by the adapter plate are preferably used for this purpose. To assure a tight seal between the grommet and the suction opening of the filter, the fasteners are preferably located adjacent the suction opening of the adapter plate.

The invention, together with further features and advantages thereof, may best be understood by reference to the following description taken in connection with the accompanying illustrative drawing.

BRIEF DESCRIPTION OF THE DRAWING

FIG. 1 is an inverted isometric view of a fluid transmission of the type with which the adapter plate of this invention can be utilized.

FIG. 2 is an isometric view of a preferred adapter plate.

DESCRIPTION OF THE PREFERRED EMBODIMENT

Figure 4:
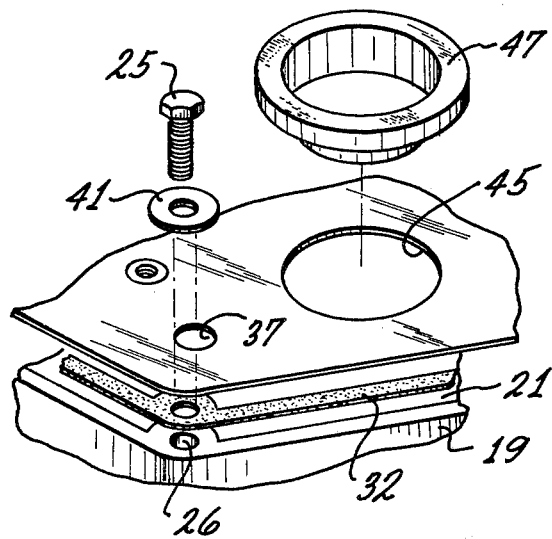
FIG. 4 is a fragmentary exploded isometric view illustrating the attachment of the adapter plate to the transmission and the grommet.
Figure 5:
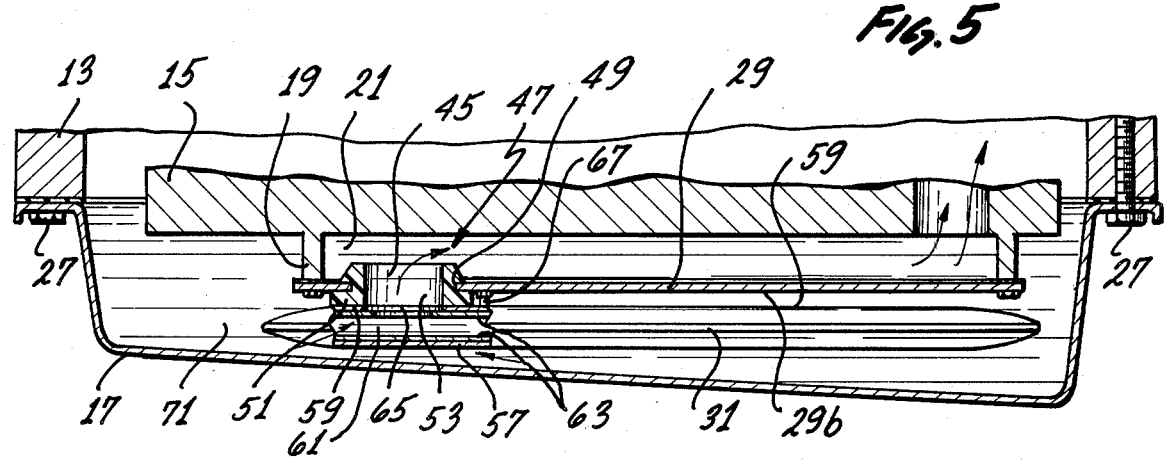
FIG. 5 is a fragmentary sectional view of a portion of the transmission with the adapter plate and filter installed on the transmission.

FIG. 1 shows a fluid transmission 11 for a vehicle, such as a car or a truck. The transmission 11, which may be conventional, generally comprises a main housing section 13, a housing section 15 and a pan 17. The housing section 15 includes a wall 19 defining an open-ended cavity 21 (FIGS. 1, 4 and 5). The housing section 15 is attached to the main housing section 13 by a series of fasteners 23 (FIG. 1) which do not extend through the wall 19 and a second series of fasteners 25 which extends through bolt holes 26 (FIG. 4) in the wall 19. The pan 17 is attached to the main housing section 13 by removable threaded fasteners 27.

An adapter plate 29 is mounted on the wall 19 by the fasteners 25 and closes the open-ended cavity 21. The adapter plate 29 is used to mount a fluid filter 31 on the transmission 11. A gasket 32 (FIGS. 4 and 5) is clamped between a peripheral region of the adapter plate 29 and the wall 19 to seal the interface between the wall and the adapter plate. The gasket 32 may be a separate member or integral with the adapter plate 29 as a result, for example, of being sprayed on the adapter plate.

The adapter plate 29 in the embodiment illustrated is in the form of a thin, rigid plate having opposite inner and outer faces 29a and 29b which are planar and parallel. The adapter plate 29 has a periphery 33 (FIG. 2) which approximates the periphery of the wall 19 but which preferably lies slightly outside of the periphery of the wall 19. The adapter plate 29 which is preferably constructed of a rigid metal, such as aluminum or steel, has a series of attaching holes 35, 37 and 39 adjacent the periphery 33 with these attaching holes arranged such that at least some of them are in registry with at least some of the bolt holes 26 for the fasteners 25 in the wall 19. Accordingly, the fasteners 25 can project through some or all of the attaching holes 35, 37 and 39 to attach the adapter plate to the wall 19. The heads of the fasteners 25 help to space the filter 31 from the adapter plate 29.

The attaching hole 37 is of larger cross-sectional area than some of the other attaching holes 35. Accordingly, this enables the adapter plate 35 to be utilized with transmissions which have a bolt hole 26 for the corresponding fastener 25 shifted slightly from the center of the attaching hole 37, i.e., a different bolt-hole pattern. Because the attaching hole 37 is over-sized in relation to the associated fastener 25, its periphery is preferably sealed as by a rubber washer 41 (FIG. 4) through which the fastener 25 extends.

Figure 3:
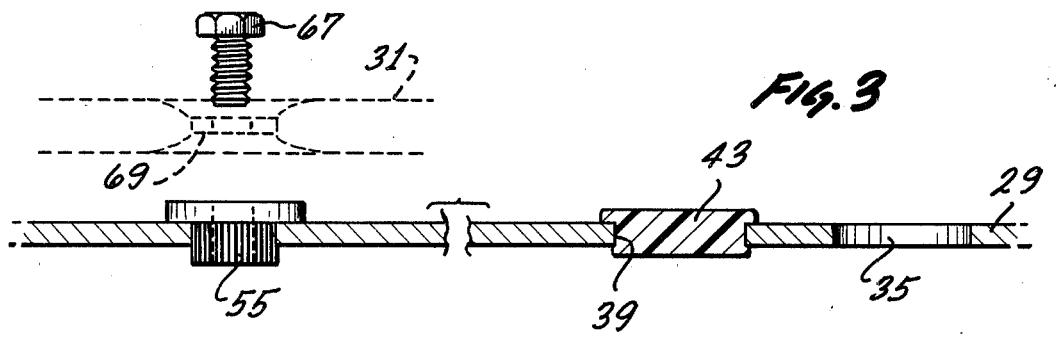
FIG. 3 is an enlarged fragmentary sectional view taken generally along line 3—3 of FIG. 2.

The attaching hole 39 is spaced inwardly from an adjacent attaching hole 35 to permit the adapter plate to be attached to a transmission having a bolt-hole pattern which might utilize the attaching hole 39. The attaching hole 39 lies within the region circumscribed by the attaching holes 35 and 37, and consequently, to prevent leakage through the attaching hole 39 when the latter is not utilized for attaching purposes, it is plugged by a suitable plug 43 (FIGS. 2 and 3) of rubber or plastic material.

The adapter plate 29 has a suction opening 45 (FIG. 4) for providing communication to the cavity 21 (FIG. 5). The suction opening is of larger area than any of the attaching holes and lies within the region circumscribed by the attaching holes 35, 37 and 39. A spacer in the form of a resilient grommet 47 of rubber or plastic material is carried by the adapter plate 29. The grommet 47 may be forced into the suction opening 45 until the rim of the suction opening 45 is received in an annular groove 49 (FIG. 5) to retain the grommet on the adapter plate and within the suction opening. In this position, a washer-like section 51 of the grommet projects from the outer face 29b of the adapter plate.

The grommet 47 is tubular and has an axial cylindrical passage 53 extending through it.

To mount the filter 31 on the adapter plate 29, the adapter plate has apertures which receive nuts 55. The nuts 55 are tightly frictionally retained within the adapter plate 29 and may be, for example, one portion of a self-clinching fastener, such as a Pem Nut. The nuts 55 and the suction opening 53 lie within the region circumscribed by the attaching holes 35, 37 and 39.

Although the adapter plate 29 can be utilized to attach filters of different construction to the fluid transmission 11, the filter 31, which is of conventional construction, has an outer filter surface 57 (FIG. 5), an inner filter surface 59, a hollow passage 61 between the filter surfaces 59 and 57 defined by an apertured support 63, and a suction opening 65 in the inner filter surface 59. The filter 31 is attached to the nuts 55 by two screws 67 (only one being shown in FIG. 3) which pass through metal grommets 69 extending through the filter 31. When so attached, the inner filter surface 59 confronts the adapter plate 29, and the suction openings 65 and 45 are in registry with each other. Communication between the suction openings 45 and 65 is provided by the passage 53 through the grommet 47. The section 51 of the grommet 47 spaces the inner filter surface 59 from the adapter plate 29 over a major region of the length of the filter 31. Accordingly, transmission fluid 71 (FIG. 5) can contact and pass through both of the filter surfaces 57 and 59.

In use of the transmission 11, the transmission fluid 71 is pulled through both of the filter surfaces 57 and 59, the suction opening 65 and the passage 53 into the cavity 21 where it is utilized by the transmission 11 in the usual manner. Any or all of the attaching holes 35, 37 and 39 can be used depending upon the configuration of the pattern of the bolt holes 26 in the wall 19. If the attaching hole 39 is used, the plug 43 is not used inasmuch as the adjacent attaching hole 35 would then lie outside of the region which must be sealed.

The adapter plate 29, the grommet 47, the plug 43, the washer 41, the nuts 55, and the screws 67 can be provided in kit form with or without the filter 31.

Although an exemplary embodiment of the invention has been shown and described, many changes, modifications and substitutions may be made by one having ordinary skill in the art without necessarily departing from the spirit and scope of this invention.

I claim:

1. In a fluid transmission having first and second sections wherein the first section includes wall means defining an open-ended cavity for fluid, bolt holes arranged in a predetermined pattern in the wall means, and fasteners in the bolt holes for at least assisting in attaching the first section to the second section, the improvement comprising:

an adapter plate covering the open end of the cavity;

said adapter plate having a series of attaching holes arranged such that at least some of the attaching holes can be in registry with at least some of said bolt holes in the wall means whereby said fasteners can also attach the adapter plate to the wall means;

sealing means for sealing the interface between the wall means and the adapter plate;

said adapter plate having a suction opening leading to said cavity;

a fluid filter having outer and inner filter surfaces and a suction opening in the inner filter surface, said inner filter surface being adapted to confront the adapter plate with the suction openings being in registry with each other;

spacer means between said adapter plate and said inner filter surface for spacing the inner filter surface from the adapter plate and for providing communication between the suction openings; and means for attaching the filter to the adapter plate with said suction openings being in communication via the spacer means and with the inner filter surface facing the adapter plate and being in spaced relationship thereto.

2. An improvedment as defined in claim 1 wherein at least one of the attaching holes is larger than another of the attaching holes whereby the adapter plate is adapted to be mounted on wall means having bolt holes arranged in a different predetermined pattern.

3. An improvement as defined in claim 1 wherein at least one of said attaching holes is not in registry with any of said bolt holes and said improvement includes a plug for plugging said one attaching hole, the attaching holes other than said one attaching hole circumscribe a region, and said one attaching hole lies within said region.

4. An improvement as defined in claim 1 wherein said spacer means includes a resilient tubular grommet carried by said adapter plate with at least a portion of the grommet being between the adapter plate and the filter and engaging the filter.

5. An improvement as defined in claim 1 wherein the attaching means includes at least two fasteners extending through the filter and into apertures in the adapter plate adjacent the suction opening of the adpater plate.

6. An improvement as defined in claim 5 wherein each of said two fasteners which extend through the filter includes a self-clinching fastener having one portion thereof carried by said adapter plate.

7. An improvement as defined in claim 1 wherein a first of the attaching holes is larger than a second of the attaching holes whereby the adapter plate is adapted to be mounted on wall means having bolt holes arranged in a different predetermined pattern, one of said attaching holes being out of registry with all of said bolt holes, said improvement includes a plug for plugging said one attaching hole, said spacer means includes a resilient tubular grommet carried by said adapter plate with at least a portion of the grommet being between the adapter plate and the filter, said portion of the grommet engaging the inner filter surface.

* * * * *